Aug. 26, 1941.                N. LESTER                2,254,119
                        PLASTIC CASTING MACHINE
                          Filed May 18, 1937
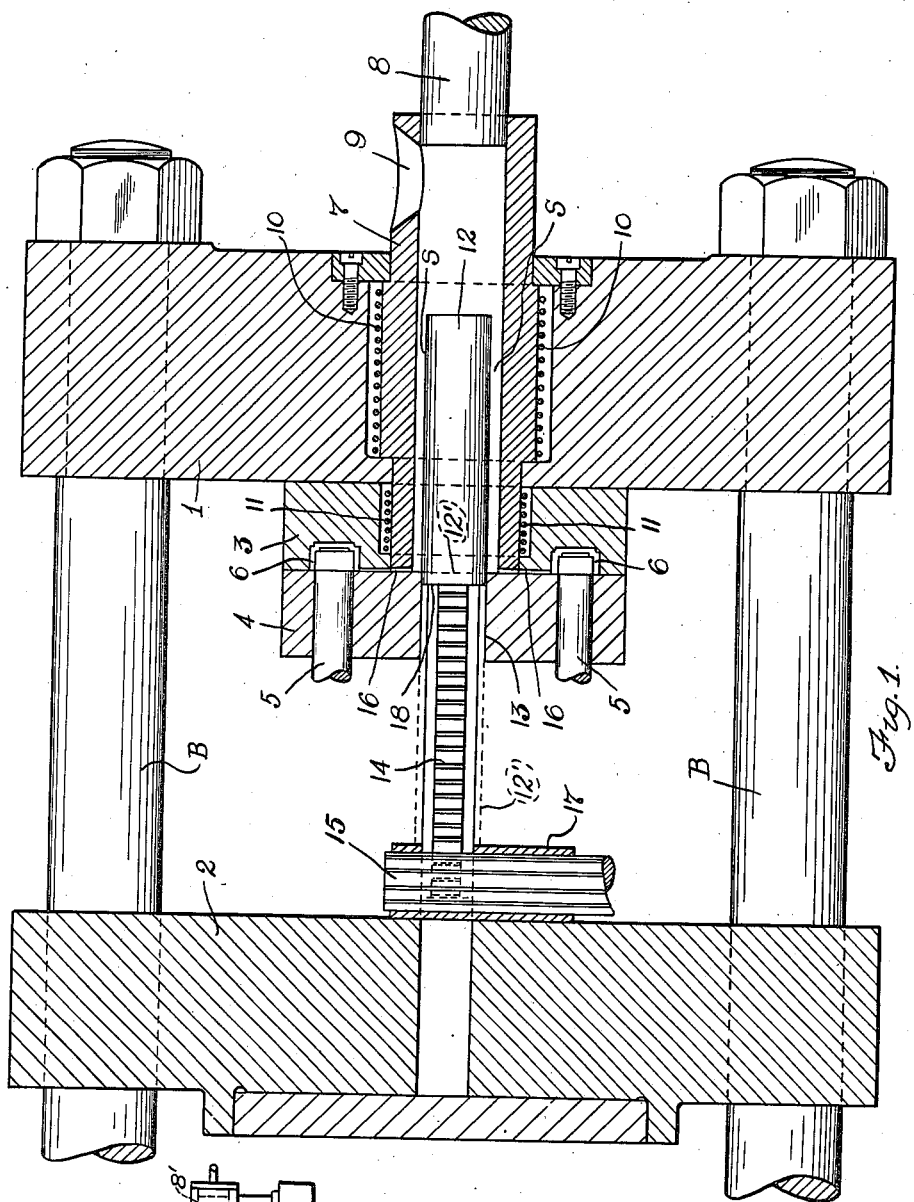
INVENTOR.
Nathan Lester
BY
Fay, Oberlin & Fay
ATTORNEYS.

Patented Aug. 26, 1941

2,254,119

UNITED STATES PATENT OFFICE 2,254,119

PLASTIC CASTING MACHINE

Nathan Lester, Cleveland Heights, Ohio, assignor to The Lester Engineering Company, Cleveland, Ohio, a corporation of Ohio Application May 18, 1937, Serial No. 143,313

6 Claims. (Cl. 18—30)

The present invention relates to a machine for the casting of materials under pressure, particularly material such as plastics which are originally in a finely divided or powdered form and subsequently subjected to heat and pressure before they are injected into the mold cavity. Since the thermo-conductivity of such plastic materials is relatively low, and since it is necessary to obtain a uniform heating throughout the body of the material in a limited time, it has been found expedient in the art to reduce or thin out the cross-sectional thickness of the body or mass of plastic material during the heating and pressure casting operation.

The general object of my invention therefore is to provide a novel and efficient means for distributing the plastic material throughout a space of relatively narrow cross-sectional thickness while such material is passing through the pressure casting and heating chamber of the machine. Briefly outlined, such novel means comprises a plunger or solid body reciprocable in the interior of the pressure casting chamber and having its walls spaced from the walls of such chamber so that the bulk or body of the mass of plastic material introduced into such chamber is caused to enter such space upon operation of the pressure plunger which is in contact with the walls of the chamber and to thereby transpose and distribute the mass of material from a relatively large, thick cross sectional form to a relatively narrow, thinned out cross-sectional form.

Another object and inherent advantage of my invention is the elimination of any projecting surfaces in the pressure casting chamber so that a complete stroke of the pressure casting plunger is effective to eject all of the material from the chamber or cylinder, thus eliminating the possibility of having any material collect and remain in such cylinder or chamber to cause clogging and incident inefficiency and possible stoppage of the operation of the machine.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a cross-sectional elevation of an apparatus illustrating the principle of my invention, and Fig. 2 is an elevational view of the device of Fig. 1, as assembled with a power cylinder for moving the material ejecting plunger.

Referring more particularly to the drawing, there are shown therein a pair of relatively movable die plates 1 and 2, the die plate 1 being fixedly supported on the ends of the tie rods or supporting bars B and the die plate 2 being slidably mounted on the bars B. The die plate 1 carries the die block 3 and the die plate 2 carries the die block 4. The specific manner of attachment of the die blocks 3 and 4 to the die plates 1 and 2 respectively is not shown or further explained since it is well known to those skilled in the art. Core or ejector pins 5 pass through the die block 4 and terminate in the die or mold cavity 6 formed between the die blocks 3 and 4.

A pressure casting chamber or cylinder 7 is mounted in the die block 1 and the pressure plunger 8, having a close fit with the interior of the cylinder 7 is reciprocable therein and extends out through the feed end of the cylinder and is operated by a hydraulic cylinder H and piston 8'. A material feed inlet 9 is provided adjacent the right hand or feed end of the cylinder 7. Electric heating coils 10 and 11 surround the intermediate and the discharge or left hand end portion of the cylinder 7 respectively.

A second plunger 12 is reciprocable in the left hand portion of the cylinder 7, and has a diameter less than the inner diameter of the cylinder, so that there is a space S provided between the walls of the plunger 12 and the walls of the cylinder 7. The plunger 12 passes through an opening or bore 13 in the die plate 4 and has a gear rack 14 which meshes with the gear toothed shaft 15.

Passages 16 communicate from the discharge end of the cylinder 7 to the mold cavity 6 and are located substantially along the parting line of the die blocks 3 and 4.

The gear toothed shaft 15 is carried in a bearing block 17 and connected with friction means for retarding its rotation and thereby retarding the movement of the plunger 12 in a left hand direction. The construction of such means to which the shaft 15 is connected is more fully shown and described in my joint, co-pending application Serial No. 29,638, filed July 3, 1935 and since issued into Patent No. 2,112,343. Reference to this patent will show that such means is also adapted to move the plunger 12 in a right hand direction into the interior of the pressure cylinder 7 as the die plates 1 and 2 and die blocks 3 and 4 are moved into closed position and as the machine becomes ready to start the cycle of its casting operations.

In the operation of the above described apparatus, the plastic material is introduced through the feed opening 9 into the interior of the cylinder 7 where it occupies the space between the ends of the plungers 8 and 12. The plunger 8 then moves in a left hand direction to compress such material and force it into the space S between the plunger 12 and the walls of the cylinder 7. During such movement of the plunger 8, the plunger 12 will remain stationary due to the resistance imposed upon the shaft 15 and transmitted to the plunger through the gear rack 14. But as soon as the end of the plunger 8 contacts with the end of the plunger 12, such resistance will be overcome, and the material which has entered the space S and has had an opportunity to become heated by means of the heating coils 10 and 11, will be forced through the passages 16 into the mold cavity 6. In order to provide for a sufficient heating interval of the material after it has been forced into the space S by the plunger 8, an adjustable time delay control can be connected to the mechanism operating the plunger 8 so that the latter is temporarily stopped in its left hand movement, or caused to dwell at the position where it first contacts the plunger 12. After such dwell or temporary stopping of the plunger 8, it continues its left hand movement forcing the plasticized material into the mold cavity 6. The left hand movement of the plunger 12 will be stopped as soon as it occupies the position in dotted lines referred to by the numeral 12'. That is, further left hand movement of the plunger 12 is impossible as soon as its right hand end reaches a position in alignment in the face of the die block 4 and its left hand end, in the form of the shoulder 18, abuts against the face of the block 17. After the plasticized material is so forced into the mold cavity 6, it is of course allowed to set therein for a predetermined period, the die blocks 3 and 4 then moved apart, the casting ejected, the plunger 8 returned to its original position, the die blocks 3 and 4 closed, and the plunger 12 returned to its original position, whereby the parts are ready to repeat another cycle of operation.

Thus, it will be seen that the bulk of plastic material, first introduced into the pressure casting cylinder in a bulky mass of relatively thick cross-section, is subsequently reduced and thinned out to a narrow cross-sectional form, then heated and finally, completely ejected under pressure from the cylinder into the mold cavity, so that no small amounts of the material can possibly remain in the pressure cylinder to cause clogging or interference with subsequent casting operations. The plunger 8 effects a complete and positive displacement through the interior of the cylinder 7 and thus insures the complete ejection and evacuation of all material therein.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a plastic casting machine, the combination of a die cavity, a pressure cylinder having one end in communication with said die cavity and plungers reciprocably mounted in each end of said cylinder, one of said plungers having a diameter equal to the diameter of said cylinder and entering said cylinder through the other end thereof, and the other of said plungers having a uniform and uninterrupted cylindrical surface throughout its length of a diameter less than the diameter of said cylinder, means for feeding the material to be cast into the other end of said cylinder, and means for reciprocating both of said plungers whereby said material is first directed into the annular space between said cylinder and said second-named plunger and finally completely displaced therefrom.

2. In a plastic casting machine, the combination of a die cavity, a pressure cylinder having one end in communication with said die cavity and plungers reciprocably mounted in each end of said cylinder, one of said plungers having a diameter equal to the diameter of said cylinder and entering said cylinder through the other end thereof, the other of said plungers having a uniform and uninterrupted cylindrical surface throughout its length of a diameter less than the diameter of said cylinder, means for feeding the material to be cast into the other end of said cylinder, heating means for said cylinder located adjacent the discharge end thereof, and means for reciprocating both of said plungers whereby said material is first directed into the annular space between said cylinder and said second-named plunger and finally completely displaced therefrom.

3. In a plastic casting machine, the combination of a die cavity, a pressure cylinder having one end in communication with said die cavity and plungers reciprocably mounted in each end of said cylinder, one of said plungers having a diameter equal to the diameter of said cylinder and entering said cylinder through the other end thereof, the other of said plungers having a uniform and uninterrupted cylindrical surface throughout its length of a diameter less than the diameter of said cylinder, means for feeding the material to be cast into the other end of said cylinder, heating means for said cylinder located between said feeding means and said discharge means, and means for reciprocating both of said plungers whereby said material is first directed into the annular space between said cylinder and said second-named plunger and finally completely displaced therefrom.

4. In a plastic casting machine, the combination of a die cavity, a pressure cylinder having one end in communication with said die cavity and a plunger having a diameter equal to the diameter of said cylinder reciprocable throughout the length of and extending through the other end of said cylinder, a second plunger having a uniform cylindrical surface spaced from the walls of said cylinder extending through said one end of said cylinder, the ends of both of said plungers within said cylinder being spaced from each other when said first-named plunger is in retracted position in said cylinder and said second-named plunger is in extended position in said cylinder, said second plunger being retractively moved by contact with and motion transmitted from said first-named plunger, and means for heating said cylinder in that portion thereof occupied by said second plunger.

5. In a plastic casting machine, the combination of a die cavity, a pressure cylinder having one end in communication with said die cavity and a plunger having a diameter equal to the diameter of said cylinder reciprocable through the length of and extending through the other end of said cylinder, a second plunger having a uniform cylindrical surface spaced from the walls of said cylinder and extending through said one end of said cylinder, the ends of both of said plungers within said cylinder being normally spaced from each other when said first-named plunger is in retracted position in said cylinder, said second plunger being retractively moved by contact with and motion transmitted from said first-named plunger, means for feeding the material to be cast, into the space between said ends of said plungers, and means for heating said cylinder in that portion thereof occupied by said second plunger.

6. In a plastic casting machine, the combination of separable die blocks forming a die cavity, a pressure cylinder having one end in communication with said die cavity and a plunger having a diameter equal to the diameter of said cylinder reciprocable throughout the length of and extending through the other end of said cylinder, a second plunger having a uniform cylindrical surface spaced from the walls of said cylinder and extending through said first-named end of said cylinder and through said die blocks, the ends of both of said plungers within said cylinder being spaced from each other when said first-named plunger is in full retracted position in said cylinder and said second-named plunger is in full extended position in said cylinder, said second plunger being retractively moved by contact with and motion transmitted from said first-named plunger, and means for stopping such retractive movement of said second plunger when the end of the latter occupies a position in alignment with the face of one of said die blocks.

NATHAN LESTER.